Figure 1:
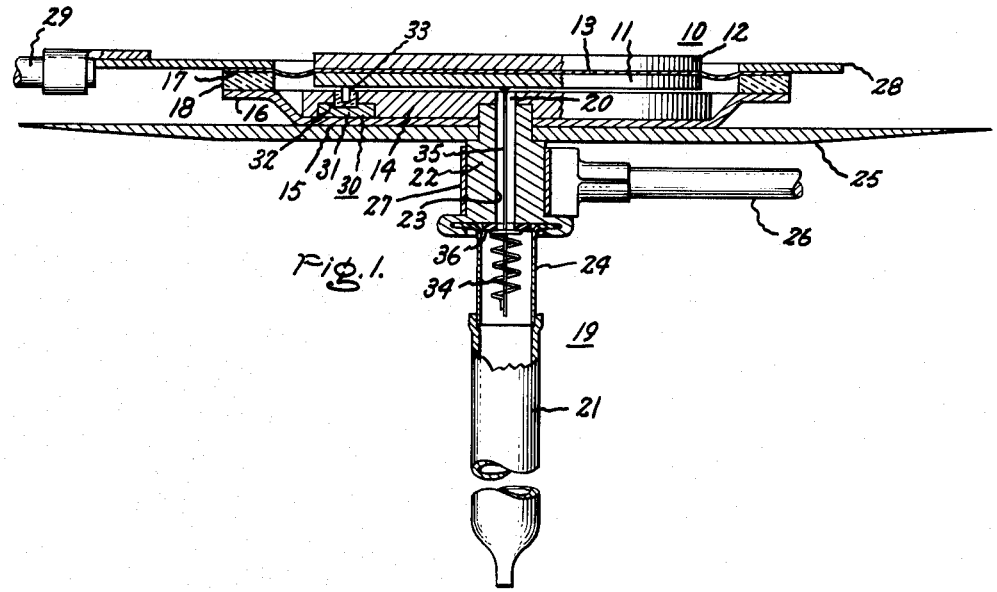

Dec. 14, 1965  J. LAWRENCE ETAL  3,223,857
THERMIONIC CONVERTER
Filed Sept. 21, 1961

Inventors:
Jackson Lawrence,
Volney C. Wilson,
by Richard R. Brainard
Their Attorney.

United States Patent Office 3,223,857
Patented Dec. 14, 1965

3,223,857
THERMIONIC CONVERTER
Jackson Lawrence, Troy, and Volney C. Wilson, Scotia,
N.Y., assignors to General Electric Company, a corporation of New York
Filed Sept. 21, 1961, Ser. No. 139,792
1 Claim. (Cl. 310—4)

The present invention relates to improved thermionic converters and particularly to converters of the vapor type.

In copending Wilson application Serial No. 698,552, filed November 25, 1957, entitled, "Method and Apparatus for the Direct Conversion of Thermal to Electrical Energy," and assigned to the assignee of this application, is described and claimed a thermionic converter and method of operation in which a metallic vapor, specifically cesium vapor, is employed for accomplishing three significant functions in the operation of the device. In the converter, heat energy is converted to electrical energy by the flow of electrons from a hot cathode electrode having a work function determined by the extent or amount of cesium on the cathode surface. This cathode work function is relatively high compared to the work function of cooler collector electrode which has a more complete layer or coating of cesium, preferably a monolayer over the entire surface. In addition to determining the work function of the cathode and collector electrodes, the positive cesium ions tend to neutralize the space charge effects which would result from the electrons in the interelectrode space. Also, the cesium vapor is supplied by a quantity of liquid cesium maintained in communication with the space between the cathode and collector but retained in a well or reservoir which is the coolest part of the device. In the particular embodiments illustrated in the pending application, the collector electrode and cesium well are maintained at proper relative temperatures by a bath of cooling fluid. In some applications, however, such means for maintaining the proper relative temperatures are unsatisfactory as, for example, in a device designed for converting solar energy to electrical energy and particularly for such a device for use in outer space, it is necessary that it be kept light in weight and also it is preferable that the construction of the device itself provide for the desired temperature differential between the major operating components including the cathode, the collector, and the reservoir for the liquid metal which supplies the vapor to the interior of the device.

Accordingly, it is an important object of the present invention to provide an improved and simplified thermionic converter, particularly of the vapor type in which the temperature differential between the heated cathode and the other operative parts of the device is itself maintained by the thermal conduction and radiation of the parts of the assembly itself without external temperature controlling means.

Figure 2:
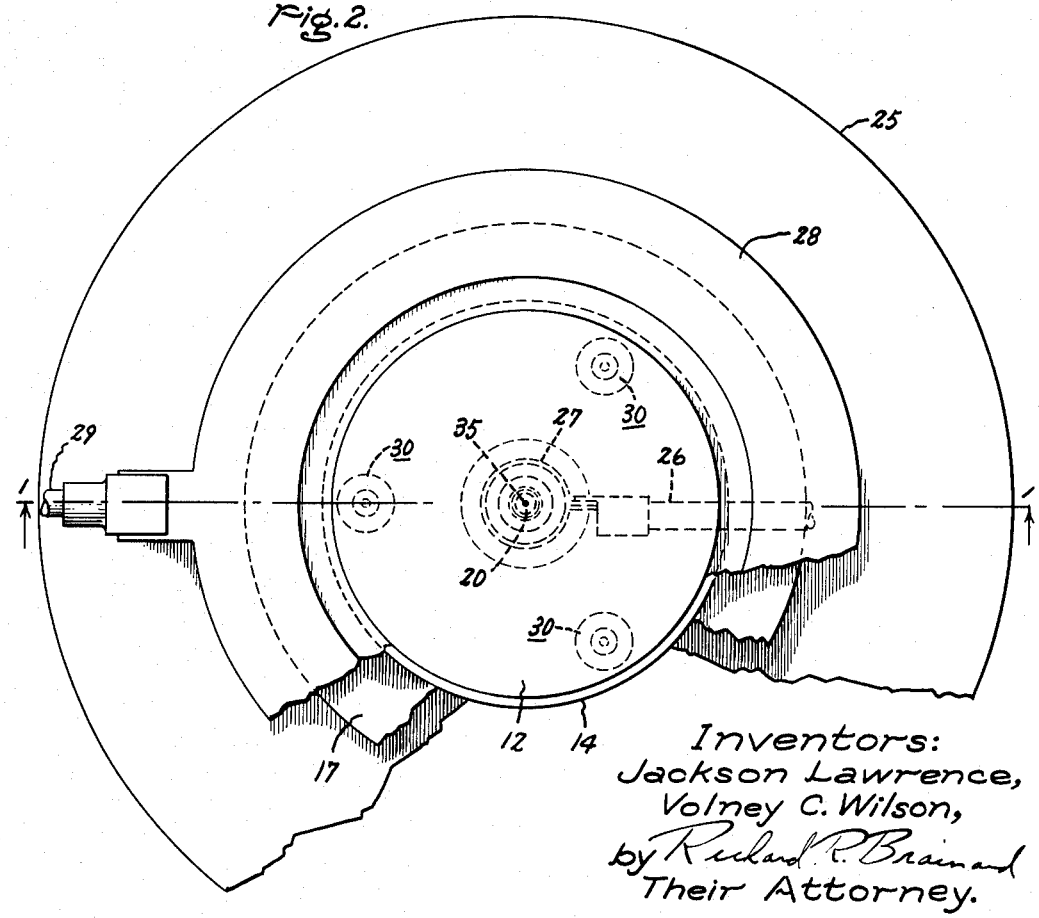

In accordance with the illustrated embodiment of the invention, a relatively massive cathode is supported in insulated and closely spaced relation with respect to a collector electrode by a metallic support and electrical connection having reduced capacity for the transmission of thermal energy. The liquid metal which supplies the metallic vapor is contained in a reservoir in communication with the interior of the device and supported from the collector electrode by means including between the collector electrode and the reservoir a section of reduced heat transmitting capacity. Heat dissipating means are also associated with the collector electrode. The device of the present invention is capable of operating in a vacuum or rarefied atmosphere with no additional temperature regulating means with the proper relative temperatures being maintained by the heat distribution from the heated cathode electrode that takes place as a result of the thermal characteristics built into the device. The present invention, together with further objects and advantages thereof, will be better understood by reference to the following drawing and its scope will be pointed out in the appended claim. In the drawing:

FIG. 1 is an elevational view, partially in section, of an improved thermionic converter embodying the present invention; and FIG. 2 is a plan view, partially broken away, of the device shown in FIG. 1.

The preferred embodiment of the present invention illustrated in the drawing is a thermionic converter of the planar type and of generally circular configuration. The converter includes a cathode assembly 10 made up of a pair of disks 11 and 12 having sandwiched therebetween a thin diaphragm 13 to which the disks 11 and 12 are bonded, as by brazing. The collector electrode assembly includes a disk-like member 14 and a backing member 15 bonded thereto and having a peripheral extension 16 for forming a part of the vacuum enclosure. The extension 16 and a similar extension 17 of the diaphragm 13 are bonded to an insulating ring 18 to complete the hermetic envelope of the device and to support the cathode member 11 and the collector electrode 14 in closely spaced and opposed relation. In the embodiment illustrated, the metallic vapor is supplied to the interelectrode space of the device from a tubulation assembly 19 depending from the central portion of the collector electrode and communicating with the interelectrode space through a passage 20. The tubulation assembly includes a tubulation 21, a hub-like member 22 having an axial passage 23 therein communicating with the passage 20 and an intermediate tubular section 24 of reduced wall thickness and therefor of limited thermal transfer capacity. The tubulation assembly is secured to the collector electrode by bonding to the collector electrode 14, the closure member 15 and an interposed disk-like radiator 25 of larger diameter than the remainder of the device. The electrical connection to the collector electrode of the device is made by a conductor 26 having a conducting band 27 engaging the outside of the hub member 22. In a similar manner the electrical connection with the cathode is provided by an annular disk-like member 28 which is bonded to the peripheral portion 17, of the diaphragm 13 and connected at one point to a conductor 29.

The minimum interelectrode space between the cathode 11 and the collector 14 is maintained by a spacing arrangement which is generally similar to that described and claimed in the copending Lawrence application Serial No. 69,414, filed November 15, 1960, entitled "Series Connection and Spacing Techniques for Thermionic Converters." As illustrated, three circumferentially spaced spacer units 30 are provided. Each spacer unit includes a circular base member 31, preferably of metal, and an insulating support member of smaller diameter 32. As illustrated these conform to the shape of recesses formed in the collector electrode 14. The insulator 32 is recessed to receive and provide a support for a spacing pin 33 which may, for example, be of tungsten. This pin is ground so that the extension above the surface of the collector electrode is a predetermined length corresponding to the desired interelectrode spacing of the device.

When the device is to be operated in a rarefied atmosphere such as in outer space, the collector and cathode may tend to separate against the bias force provided by the structure. If this does tend to occur in a particular application, the separation of the electrodes may be restrained as by the biasing spring 34 which engages the hub-like member 22 at one end and is attached at the other end to a rod 35 which is attached at its other end to the collector electrode 11. An insulating washer 36 is interposed between the spring 34 and hub-like member 22.

In the operation of converters of the type described above, some of the parts operate at high temperature and predetermined relative temperature relationships are required as previously discussed. Accordingly, the materials must be chosen with due consideration for these requirements and in accordance with an important aspect of the present invention, the structure provides for the desired relative temperatures without an external temperature controlling system. The following description of the materials employed in a specific device, as well as the assembly method, provide a better understanding of the preferred embodiment of our invention. For example, for a converter suitable for operation in outer space and heated, for example, by solar energy concentrated on the cathode by a light weight parabolic mirror (not shown) from which the converter is mounted with the cathode of the focus of the mirror, the various operating temperatures may be approximately as follows: The cathode 1800° C.; the cathode-collector electrode insulating spacer 700° C.; the collector electrode 600° C., the collector radiator 550° C.; and the cesium reservoir 300° C. In a specific device of this type the cathode members 11 and 12 are of tungsten 1½" in diameter and .062 inch thick and bonded back-to-back to the interposed diaphragm 13 which is of tantalum foil .0015 inch thick. The collector 14 is of nickel and the backing plate 15 of tantalum. The periphery 16 of the plate 15 and the periphery of the diaphragm 13 are bonded to the insulator 18 by a suitable ceramic-to-metal bonding process such as, for example, the nickel-titanium shim process described and claimed in Patent 2,857,663, Beggs, dated October 28, 1958. The radiator 25 is of copper and is copper alloy brazed through the back of the tantalum plate 15. Preferably, the radiator is covered with a black coating such as black iron oxide or zirconium carbide. The hub 13 of the tubulation may be integral with the radiator or formed separately as illustrated and brazed to the assembly. Tubulation 21 may also be of copper and the section of restricted heat transfer capacity 24 may be nickel tubing having a wall thickness of 10 mils and a length of approximately 2 centimeters.

The liquid metal for providing the vapor within the device is provided by a quantity of cesium, potassium or rubidium, preferably cesium and in a particularly suitable method of manufacture, the cesium is contained in a frangible capsule in the tubulation and the device exhausted through the tubulation and sealed off by a cold weld as illustrated at 33. Subsequently the frangible capsule is broken by compressing the tubulation sufficiently to release the cesium into the interior of the device.

The three major operating components with respect to temperatures, namely, the cathode, the collector and the cesium well are each associated with parts having substantial mass and substantial thermal capacity. Also, these elements are separated from one another by structural members of reduced thermal capacity and reduced thermal transmitting capacity so that as a result temperatures of these elements tend to stabilize at a relatively constant value and at values relative to one another determined by the heat transfer from the cathode to the remainder of the structure and the radiation from the various parts. It will be apparent to those skilled in the art that additional radiation may be secured between the cathode and the collector, for example, by attaching an additional radiation member (not shown) to the terminal 28, for example.

The operation of the device embodying the present invention is believed to be well understood by those skilled in the art. Heat, such as solar heat, concentrated by a mirror, impinges on the disk 12 of the cathode to uniformly heat the cathode structure to a high temperature which, as suggested, may be in the order of 1800° C. With the limited heat conducting capacity of diaphragm 13 and the heat radiator 25 associated with the collector electrode 14, this latter electrode operates at approximately 600° C. and the cesium reservoir at 300° C. Under these circumstances, the cathode will be coated with a partial layer of cesium and the anode completely coated so that the work function of the cathode is higher than that of the collector and the electrons are driven from the cathode by the high heat energy supplied thereto. Not all of this energy is lost when the electrons are collected in the collector by virtue of its lower work function and the difference in these work functions or the contact potential is available as an external voltage of the thermionic generator. With the temperatures given in the preceding specific example, the cesium pressure and work functions are determined. A cesium reservoir temperature of 300° C. corresponds to a cesium pressure of 1.5 mm. of mercury. At 1800° C. the tungsten cathode has a work function of about 3.2 volts and the cesium coated nickel collector has a work function of about 1.5 volts. As will be readily appreciated, the converter may be operated with the parts at other temperatures and with other temperature differences between the various electrodes. The choices are not free, however, and have direct and substanial effects on operation. The temperature of the coolest part of the device will be the cesium reservoir and this determines the cesium pressure. The cesium pressure and the temperature of the collector and cathode electrodes and the materials thereof determine the work functions of these electrodes and the emission of the cathode for a given temperature. The difference between the collector work function and the cathode work function is the maximum output voltage that could be obtained and this output voltage is actually reduced by an amount equal to the voltage drop in the interelectrode space. Operating information of the above type is available and is given for tungsten wire in cesium vapor, for example, in FIG. 5 of the above-identified Wilson application.

While a particular embodiment of the invention has been described and illustrated, it will be apparent to those skilled in the art that many changes and modifications may be made without departing from our invention in its broader aspects and we aim, therefore, in the appended claim to cover all such changes and modifications as fall within the true spirit and scope of our invention.

What we claim as new and desire to secure by Letters Patent of the United Sates is:

A cesium vapor thermionic converter comprising a cathode electrode having a planar metal surface, collector electrode having a planar metal surface, means supporting said electrodes in closely spaced opposed relation and exposed to the interior of a vacuum-tight envelope including a thin metal diaphragm extending from the periphery of said cathode and a peripheral extension of said collector electrode and means hermetically bonding said diaphragm and said extension together in insulated relation, a tubulation depending from said vacuum-tight envelope and communicating with the space between said electrode surfaces and thermally connected with said collector electrode, said tubulation including a section of reduced wall thickness for limiting the transfer of heat from said collector electrode to the remote portion of said tubulation, a quantity of liquid cesium within said tubulation, said diaphragm and said section of reduced thickness operating to maintain the desired temperature differential between the cathode and collector and between the collector and the liquid cesium, respectively, when said cathode is heated to operating temperature.

References Cited by the Examiner

UNITED STATES PATENTS

| | | | |
|---|---|---|---|
| 2,778,967 | 1/1957 | Johnstone | 313—148 |
| 3,054,914 | 9/1962 | Hatsopoulos et al. | 310—4 |
| 3,144,569 | 8/1964 | Coles | 310—4 |

FOREIGN PATENTS 854,036  11/1960  Great Britain.

OTHER REFERENCES

Oman and Street: Experimental Solar Thermionic Converter for Space Use, in Electrical Engineering, pages 967 to 972, December 1960.

ORIS L. RADER, *Primary Examiner.*
MILTON O. HIRSHFIELD, *Examiner.*